United States Patent Office 3,317,337
Patented May 2, 1967

3,317,337
METHOD OF METALLIZING LUMINESCENT SCREENS
Theodore A. Saulnier, Lancaster, Pa., assignor to Radio Corporation of America, a corporation of Delaware
No Drawing. Filed Mar. 18, 1963, Ser. No. 266,033
10 Claims. (Cl. 117—33.5)

This invention relates to luminescent screens and to the application of specular metal backing layers thereto. The invention is particularly directed to a method of applying a coating layer of a non-flammable, organic, heat-removable material over the phosphor material of the screen for the purpose of providing a smooth substrate upon which the specular metal backing layer can be deposited.

It is preferred to use a water emulsion of organic materials such as certain acrylic resins for providing the organic substrate on which to deposit the specular metal backing layer. Such resins not only form a very smooth surface but also are non-flammable. U.S. Patent 3,067,055 issued Dec. 4, 1962, to T. A. Saulnier describes the use of such water emulsions to produce an organic substrate for a specular metal backing layer.

Such an organic substrate should be thin enough to dry without blistering and with sufficient crazing to permit the volatile materials of the screen to be removed during bake-out. At the same time, the substrate should be thick enough to fill in and/or bridge the surface cavities of the phosphor layer. This filling in and bridging prevents the metal backing layer from occluding (wrapping around) the surface phosphor particles and thus trapping light emitted by these particles.

In some cathode ray tubes, for example, certain color television tubes, the luminescent screens may comprise a mosaic of elemental areas of different phosphors. The different phosphors may be of different particle sizes and may contain different percentages of an organic polymeric binder such as polyvinyl alcohol. Because of these differences, the different phosphor areas of the mosaic screen may respond differently to the application of the organic emulsion substrate material. For example, the emulsion may adhere to the different phosphor areas in different thickness coatings. These differences complicate the laying down of the organic substrate.

In the case of phosphor layers which have a low polyvinyl alcohol/phosphor ratio or a low percentage of polyvinyl alcohol (hereinafter referred to as low polyvinyl alcohol layers) and/or which comprise large phosphor particles, the requirements for laying down the organic substrate are especially troublesome. In low polyvinyl alcohol phosphor layers, the scarcity of water-swellable polyvinyl alcohol results in less water being imbibed and hence less emulsion solids being deposited. A thinner layer of emulsion solids in turn results in the evaporated metal layer more closely following the contour of the individual phosphor particles. This increases the likelihood of the metal layer occluding phosphor particles and hence their emitted light. The lower imbibition of low polyvinyl alcohol layers also results in fewer opportunities for the organic substrate to bridge over interstitial openings in the phosphor layer.

In the case of a phosphor layer comprising large phosphor particles, the screen is coarse with large interstices between the particles. Such layer coarseness results in increased likelihood of the metal backing layer wrapping around the surface phosphor particles, especially when the organic substrate is thin and/or discontinuous as is the case with low percentage polyvinyl alcohol phosphor layers.

It is therefore an object of this invention to provide an improved method of applying to a phosphor layer a non-flammable, organic, heat-removable substrate having a surface of high specular quality on which a light-reflective, electrically conductive backing layer can be deposited.

It is also an object of this invention to provide a method of applying an improved non-flammable, organic substrate of heat-removable material which is especially suitable for application to a luminescent screen which contains relatively low amounts of polyvinyl alcohol and/or which is composed of a plurality of discrete phosphor areas having different physical characteristics.

Certain materials are hereinafter described as being film-forming, nonfilm-forming or partially (not completely) film-forming. As used herein, the term film-forming describes a material which upon drying fuses into a continuous coating or film substantially free of cracks, holes, or gross discontinuities over areas of substantial size, e.g. areas having a minimum breadth of about 10–15 mils. Such may be contrasted with e.g., a granular layer of discrete particles which are not fused together. Coatings of film-forming materials are usually characterized by being relatively soft and elastic whereby they withstand the stresses of drying without rupturing.

The degree to which a material is film-forming may not be a fixed factor but may vary depending upon e.g., the temperature of application and/or of drying and the thickness of the layer in question. Generally speaking, as the temperature of application and/or of drying is increased, the film-forming property of a material is increased, and as the coating thickness (in a useful range) is increased, the film-forming property is decreased. Thus, although a material does have a specific degree of film-forming quality, which distinguishes it from the other materials, that degree may vary with certain conditions. Accordingly, when considered in the light of practical application parameters, a material may be either film-forming, nonfilm-forming or partially film-forming.

According to the invention, an organic substrate for a specular metal backing layer is provided by first applying over a phosphor layer a thin undercoating of a selected non-flammable, liquid mixture (preferably water-based) containing a material having good film-forming properties at relatively low temperatures. The layer of undercoating mixture is then dried. The film-forming undercoat material is one which need not form with a surface smoothness of specular quality such as is desired for the organic substrate upon which the metal backing layer can be deposited. A top-coating of non-flammable emulsion (preferably water-based) containing a material which is not completely film-forming at the desired relatively low temperature, but which will form a coating having a surface smoothness of good specular quality, is then applied over the undercoating of the film-forming material. This emulsion top coating is then dried.

A coating of a suitable metal e.g. aluminum, may then be deposited such as by evaporation in vacuum onto the top coating.

The film-forming material for the undercoating need not be capable of providing a surface of high specular quality. The undercoating is applied for the specific purpose of providing a continuous film which substantially follows the phosphor layer and assists in preventing penetration of the evaporated metal to points deep within the phosphor layer. The film-forming undercoat material should: (a) be nonflammable; (b) be either soluble or dispersable in water prior to application; (c) be water insoluble upon drying so that the subsequent top-coating emulsion will not dissolve and wash away the undercoat when it is applied thereto; (d) be film-forming at relatively low temperatures e.g. 20° C., i.e. assist in filling in and/or bridging the surface cavities of the phosphor layer without becoming excessively crazed, whereby to provide a substantially continuous coating layer; (e) remain rewettable for a time after it has been dried so as not to repel the subsequently applied water emulsion top coating; (f) be of such a nature that the chosen top-coating emulsion material will adhere to it; (g) be vaporizable and thus removable by conventional bake-out and exhaust techniques, e.g. at below 450° C.; and (h) preferably be of relatively low viscosity in useable concentrations so that portions thereof which are spread over the side panels of the tube envelope can be trimmed (rinsed) therefrom by water jets.

Materials which have been found to be suitable for use as the film-forming undercoat material include water mixtures (solutions or emulsions) of polymers such as polyvinyl acetate, polyvinyl alcohol, and acrylic resins of the type which are soft enough to be film-forming at the temperature of application.

Where a water soluble material such as polyvinyl alcohol is used alone, it should have added thereto a suitable agent such as a dichromate or an aldehyde with acid catalyst so as to render the material capable of being made insoluble after application over the phosphor layer. A material such as polyvinyl alcohol, though capable of providing an excellent undercoat, does possess the slightly objectionable feature of high viscosity which complicates the removal thereof from the tube envelope surrounding the screen, by water trimming techniques.

A humectant such as ethylene glycol, polyethylene glycol, or glycerol may be added to the undercoat material to assist in film formation and/or in rewetting of the undercoat during subsequent application of the topcoat. Such humectants may advantageously be added in concentrations up to 100 weight percent (and even higher) of the undercoat material solids depending upon the need of a humectant and the particular drying schedules employed.

Where a soft type, or chemically softened, acrylic polymer containing ethyl acrylate, ethyl methacrylate, methyl acrylate, methyl methacrylate, butyl methacrylate, or copolymers thereof is used for the film-forming undercoat material of the substrate, the amount of material applied, as well as the drying schedule thereof, may be somewhat critical. Overdrying and/or too heavy an acrylic emulsion undercoating can result in a hydrophobic surface which will not be wet evenly by the topcoat emulsion. However, a small amount of water soluble polymer such as polyvinyl alcohol or hydroxyethyl cellulose can be added to the acrylic resin to reduce its hydrophobic properties without seriously affecting the ease and thoroughness of the water trimming which may subsequently be employed.

The film-forming properties of an acrylic resin can be enhanced by the addition thereto of a plasticizer. The plasticizer serves to "soften" the resin. Materials suitable for use as the plasticizer include, for example, dibutyl phthalate, butyl phthalate, butyl glycolate, methyl phthalate, and ethyl glycolate. Such plasticizer material may be added to the acrylic resin in an amount of up to 10 weight percent of the resin. When so used, the plasticizer causes the acrylic resin to have a given film-forming quality at a lower temperature than the temperature at which it would otherwise have the same film-forming quality. Although the addition of a high concentration of plasticizers may reduce the surface smoothness of the dried resin layer, this is not objectionable, since the top coat is to be subsequently applied over the undercoat.

Of the suitable film-forming undercoat materials hereinbefore named, vinyl acetate copolymerized with another substance providing hydrophilic groups is preferred. For example, a copolymer of principally vinyl acetate with small amounts of acrylamide or sulfonated vinyl provides the desirable quality of being self emulsifying and at the same time possesses the low viscosity qualities of pure polyvinylacetate. Such copolymerized polyvinyl acetate materials are commercially available from the Dewey & Almy Co. under its trade designation Darex Everflex and identified as A, B, MA or MF.

Another suitable polyvinyl acetate is commercially available from E. I. duPont de Nemours Co. under its trade designation of Elvacet. This material, however, has a protective colloid added thereto, which while stabilizing the dispersability of the material, causes it to be undesirably viscous in those applications where water trimming techniques are to be employed.

Where the particular polyvinyl acetate to be used is not copolymerized with a substance providing suitable hydrophilic groups such as acrylamide or sulfonated vinyl, a suitable emulsifier or soap constituent material may be added to promote emulsification and/or a protective colloid such as polyvinyl alcohol or hydroxyethyl cellulose added to stabilize the emulsion.

The specific concentration of the film-forming material used to provide the undercoat will depend upon the choice of the material itself and the condition of the phosphor layer. Whatever film-forming material is used, the formulation is chosen so that good film-forming properties are obtained. In the case of the preferred copolymerized polyvinyl acetate, described above, a suitable composition comprises a water emulsion thereof containing from 2 to 10 weight percent of the polyvinyl acetate copolymer.

The material used to provide the top coating of the substrate is one which: (a) is nonflammable, (b) has a low content of both emulsion promoting constituents and protective colloids so that it is capable of forming with a surface smoothness of specular quality, (c) is vaporizable and thus heat removable by conventional bake-out and exhaust schedules below 450° C., (d) is only partially film-forming at the applied concentrations, film thicknesses, and relatively low application temperatures of e.g., 30° C., i.e., be such that upon drying, the coating will form with cracks at those spots where it is thickest, (e) is either soluble or dispersable in water prior to application, (f) preferably is water redispersable so as to facilitate salvage removal if such is necessitated, (g) preferably is of relatively low viscosity in useable concentrations so that water trimming techniques can be used, and (h) preferably is fully emulsifiably stable in the desired concentrations of 5–15 weight percent.

Materials suitable for use as the top-coating comprise acrylic polymers containing one of alkyl acrylate, alkyl methacrylate, and copolymers thereof. Preferred acrylic resins contain ethyl acrylate, ethyl methacrylate, methyl acrylate, methyl methacrylate and copolymers thereof. It is desirable for purposes of facilitating salvage operations to include acrylic acid and/or methacrylic acid groups in sufficient concentration in the resin polymers to permit redispersion of the formed substrate by alkaline water resin solutions.

Top-coating emulsions of the acrylic resins described above, are preferably made to have a resin concentration of from 2 to 15 weight percent, depending upon the composition of the undercoating layer.

Methyl and ethyl acrylate and methacrylate resins which are suitable for use as the top-coating material as described above, are commercially available in various degrees of hardness from Rohm & Haas Co. under its trade designation Rhoplex and identified as B85, B74, C72, D70 and B15. Of these acrylic resin materials, B74 is preferred. This preferred material is believed to be constituted principally of ethyl acrylate, copolymerized with a minor percentage of ethyl methacrylate, methyl acrylate and/or methyl methacrylate with small amounts of acrylic acid and/or methacrylic acid combined therewith.

As in the case where acrylic resin emulsions are used as the film-forming undercoat mixture, plasticizers may be added to the acrylic emulsions used as the top-coating of the substrate. Such plasticizers as hereinbefore named in concentrations of, for example, up to 10 weight percent of the acrylic resin, may be used to improve the film-forming quality of the acrylic resin emulsion for a given application temperature. However, depending upon the particular acrylic resin used, care must be taken not to add so much plasticizer as to degrade the surface smoothness quality of the resulting top-coating since it is this coating layer upon which the specular metal backing layer will eventually be deposited.

In one example of the practice of this invention, the prescribed undercoating and top-coating layers were applied over a mosaic dot-type phosphor screen for a shadow mask cathode ray tube in which the phosphor layer was made up as follows: blue-emitting, silver-activated, zinc sulfide phosphor having a weight ratio of polyvinyl alcohol/phosphor of 0.14; green-emitting, silver-activated, zinc cadmium sulfide phosphor having a weight ratio of polyvinyl alcohol/phosphor of 0.12; red-emitting, silver-activated zinc cadmium sulfide phosphor having a weight ratio of polyvinyl alcohol/phosphor of 0.16.

After application of the mosaic phosphor screen to a suitable faceplate panel, an organic undercoating is applied over the screen by depositing 40–60 milliliters of a 6% water emulsion of Darex Everflex MF polyvinyl acetate in a pool near the center of the screen. The screened panel is spun and tilted to spread the polyvinyl acetate emulsion thereover, and is then tilted to approximately a vertical position to pour out the excess of the polyvinyl acetate emulsion, leaving only 10–30 percent of that which was originally deposited therein. The faceplate panel, bearing the mosaic phosphor layer and the wet coating of polyvinyl acetate emulsion, is then spun and simultaneously heated for about 2½ to 3 minutes to bring the polyvinyl acetate emulsion coating to a temperature of about 35–40° C. and dry it. Water trimming techniques may be employed immediately after pour-off of the excess of polyvinyl acetate emulsion and prior to the drying of the coating on the phosphor layer.

An organic top-coating of specular quality is then applied over the polyvinyl acetate undercoating in a similar manner. Approximately 40–60 milliliters of a 10% water emulsion of Rhoplex B74 acrylic resin is deposited in the panel and spun to spread it over the undercoating. The panel is then tilted to pour off the excess of the resin emulsion leaving approximately 10–20 percent of the initial charge spread over the undercoating layer. The panel is then spun and simultaneously heated for about 2½ to 3 minutes to bring it to a temperature of about 30–45° C. to dry the resin emulsion top-coating layer. As in application of the undercoating emulsion, water trimming techniques may be used immediately subsequent to the pour off of the excess resin emulsion and prior to the drying of the resin coating.

Application of a suitable specular metal backing layer is then made over the top coating of the substrate. Such application may be according to known practices and may comprise, for example, evaporation in vacuum of a thin electron pervious layer of aluminum onto the acrylic resin topcoat of the substrate. The aluminized, screened panel may then be incorporated with other elements to form a completed cathode ray tube which is subjected to simultaneous bake-out and exhaust at temperatures ranging from 400–450° C. to vaporize and remove the organic materials including the polyvinyl alcohol in the phosphor layer, the polyvinyl acetate (and additives) of the undercoat, and the acrylic resin (and additives) of the topcoat.

What is claimed is:

1. The method of metallizing a luminescent screen comprising the steps of:
   (a) depositing on said screen from a non-flammable liquid mixture an undercoat layer comprised of a heat removable material which forms a film substantially free of cracks, holes, and gross discontinuities over areas of substantial size at the temperature of deposition but which does not form with a surface of metallizable specular quality,
   (b) drying said undercoat layer,
   (c) depositing over the dry undercoat layer from a nonflammable emulsion a topcoat layer comprised of a heat removable material which forms a film having substantial cracks, holes, and gross discontinuities over areas of substantial size at the temperature of deposition but which dries with a surface of metallizable specular quality,
   (d) drying said topcoat layer,
   (e) depositing a metallic coating onto said topcoat layer, and
   (f) heating said metallic coated screen to volatilize and remove said undercoat and said topcoat.

2. A method of metallizing a luminescent screen comprising the steps of:
   (a) depositing on said screen an undercoat layer of a water based mixture containing a material which forms a film substantially free of cracks, holes, and gross discontinuities over areas of substantial size at the temperature of deposition and which is essentially one member of the group consisting of polyvinyl acetate, polyvinyl alcohol, and soft acrylic resins,
   (b) drying said undercoat layer,
   (c) depositing over the dry undercoat layer a topcoat layer of an aqueous emulsion of an acrylic resin, which forms a film having substantial cracks, holes, and gross discontinuities over areas of substantial size at the temperature of deposition,
   (d) drying said topcoat layer,
   (e) depositing a metallic coating onto said topcoat layer, and
   (f) heating said metallic coated screen to volatilize and remove said undercoat and said topcoat.

3. The method of metallizing a luminescent screen comprising the steps of:
   (a) depositing on said screen an undercoat layer of a water based mixture containing a material which forms a film substantially free of cracks, holes, and gross discontinuities over areas of substantial size at the temperature of deposition and which is essentially one member of the group consisting of polyvinyl acetate, to which has been added an agent to render it insolubilizible in water, polyvinyl alcohol, alkyl acrylate resin to which has been added a plasticizer, and alkyl methacrylate resin to which has been added a plasticizer,
   (b) drying said undercoat layer,
   (c) depositing over the dry undercoat layer a topcoat layer of an aqueous emulsion containing a material which forms a film having substantial cracks, holes and gross discontinuities over areas of substantial size at the temperature of deposition and consists essentially of one member of the group consisting of alkyl acrylate polymers, alkyl methacrylate polymers, and copolymers thereof,
   (d) drying said topcoat layer,
   (e) depositing a metallic coating onto said topcoat layer, and
   (f) heating said coated screen to volatilize and remove said undercoat and said topcoat.

4. A method of metallizing a luminescent screen comprising, the steps of:
   (a) depositing on said screen an undercoat layer of a nonflammable liquid mixture containing a heat-removable material which forms a film substantially free of cracks, holes, and gross discontinuities over areas of substantial size at the temperature of deposition but which does not dry with a surface of metallizable specular quality,
   (b) drying said undercoat layer, (c) depositing over the dry undercoat layer a topcoat layer of an aqueous emulsion of a material which forms a film having substantial cracks, holes, and gross discontinuities over areas of substantial size at the temperature of deposition and which consists essentially of an acrylic resin selected from the group consists of ethyl acrylate polymers, ethyl methacrylate polymers, methyl acrylate polymers, methyl methacrylate polymers and copolymers thereof,
(d) drying said topcoat layer,
(e) depositing a metallic coating onto said topcoat layer, and
(f) heating said metallic coated screen to volatilize and remove said undercoat and said topcoat.

5. A method of metallizing a luminescent screen comprising, the steps of:
(a) depositing on said screen an undercoat layer of a water based mixture containing a material which forms a film substantially free of cracks, holes, and gross discontinuities over areas of substantial size at the temperature of deposition and which is essentially one member of the group consisting of polyvinyl acetate, polyvinyl alcohol, and soft acrylate resins,
(b) drying said undercoat layer,
(c) depositing over the dry undercoat layer a topcoat layer of a nonflammable aqueous emulsion of a heat-removable material which forms a film having substantial cracks, holes, and gross discontinuities over areas of substantial size at the temperature of deposition but which dries with a surface of metallizable specular quality,
(d) drying said topcoat layer,
(e) depositing a metallic coating onto said topcoat layer, and
(f) heating said metallic coated screen to volatilize and remove said undercoat and said topcoat.

6. A method of metallizing a luminescent screen comprising, the steps of:
(a) depositing on said screen an undercoat layer of an aqueous emulsion of a material which forms a film substantially free of cracks, holes, and gross discontinuities over areas of substantial size at the temperature of deposition and which is essentially polyvinyl acetate,
(b) drying said undercoat layer,
(c) depositing over the dry undercoat layer a topcoat layer of an aqueous emulsion of a material which forms a film having substantial cracks, holes and gross discontinuities over areas of substantial size at the temperature of deposition and which is essentially one member of the group cosnisting of polymers of ethyl acrylate, ethyl methacrylate, methyl acrylate, methyl methacrylate, and copolymers thereof,
(d) drying said topcoat layer,
(e) depositing a metallic coating onto said topcoat layer, and
(f) heating said metallic coated screen to volatilize and remove said undercoat and said topcoat.

7. The method of metallizing a luminescent screen comprising the steps of:
(a) depositing on said screen an undercoat layer of an aqueous emulsion containing a copolymer of essentially vinyl acetate and acrylamide,
(b) drying said undercoat layer,
(c) depositing over the dry undercoat layer a topcoat layer of an aqueous emulsion containing an acrylic resin which is essentially ethyl acrylate,
(d) drying said topcoat layer,
(e) depositing a metallic coating onto said topcoat layer, and
(f) heating the coated screen to volatilize and remove said undercoat and said topcoat.

8. The method according to claim 7 and wherein the undercoat emulsion includes 2–10 weight percent of the vinyl acetate-acrylamide copolymer and wherein the topcoat emulsion includes 2–15 weight percent of ethyl acrylate resin.

9. The method according to claim 8 and wherein the undercoat emulsion contains about 6 weight percent of the vinyl acetate-acrylamide copolymer and wherein the topcoat emulsion contains about 10 weight percent of ethyl acrylate resin.

10. A method of metallizing a luminescent screen comprising the steps of:
(a) depositing on said screen an undercoat layer of a nonflammable water based mixture containing a heat-removable material which forms a film substantially free of cracks, holes, and gross discontinuities over areas of substantial size at a temperature of about 20° C. but does not dry with a surface of metallizable specular quality,
(b) drying said undercoat layer at a temperature of about 30° C.,
(c) depositing over the dry undercoat layer a topcoat layer of a nonflammable aqueous emulsion of a heat-removable material which forms a film having substantial cracks, holes, and gross discontinuities over areas of substantial size at a temperature of about 30° C. but which dries with a surface of metallizable specular quality,
(d) drying said topcoat layer at a temperature of about 30° C.,
(e) depositing a metallic coating onto said topcoat layer, and
(f) heating said metallic coated screen to volatilize and remove said undercoat and said topcoat.

References Cited by the Examiner

UNITED STATES PATENTS 2,910,376  10/1959  Stankey _____ 117—33.5
3,067,055  12/1962  Saulnier _____ 117—33.5

FOREIGN PATENTS 234,457  6/1961  Australia.

WILLIAM D. MARTIN, *Primary Examiner.*

S. W. ROTHSTEIN, P. F. ATTAGUILE,
*Assistant Examiners.*